(12) United States Patent
Gerull et al.

(10) Patent No.: US 8,097,818 B2
(45) Date of Patent: Jan. 17, 2012

(54) PANEL BOX

(75) Inventors: Walter Gerull, Schalksmuhle (DE); Anton Bürge-Allenspach, Ormalingen (CH)

(73) Assignees: Gunther Spelsberg GmbH & Co. KG, Schalksmuhle (DE); Multi-Contact AG, Allschwil (CH)

( * ) Notice: Subject to any disclaimer, the term of this patent is extended or adjusted under 35 U.S.C. 154(b) by 875 days.

(21) Appl. No.: 12/055,875

(22) Filed: Mar. 26, 2008

(65) Prior Publication Data

US 2008/0236886 A1 Oct. 2, 2008

(30) Foreign Application Priority Data

Mar. 28, 2007 (DE) .......................... 10 2007 015 315
May 2, 2007 (DE) .......................... 10 2007 020 843

(51) Int. Cl.
*H01L 23/02* (2006.01)
*H05K 5/06* (2006.01)

(52) U.S. Cl. ......................................... 174/564; 174/59
(58) Field of Classification Search ................. 439/76.1; 174/50, 520, 541, 564, 59
See application file for complete search history.

(56) References Cited

U.S. PATENT DOCUMENTS

| 4,310,211 A * | 1/1982 | Bunnell et al. ................ 439/358 |
| 6,344,612 B1 * | 2/2002 | Kuwahara et al. .............. 174/50 |
| 6,655,987 B2 * | 12/2003 | Higashikozono et al. .... 439/535 |
| 7,648,371 B2 * | 1/2010 | Boensch et al. ............. 439/76.1 |
| 7,655,859 B2 * | 2/2010 | Naβ et al. ..................... 136/243 |
| 7,824,189 B1 * | 11/2010 | Lauermann et al. ......... 439/76.1 |
| 7,824,190 B2 * | 11/2010 | Beck et al. .................. 439/76.1 |
| 7,850,476 B2 * | 12/2010 | Good ............................ 439/358 |

FOREIGN PATENT DOCUMENTS

| DE | 102007006433 A1 | 8/2008 |
| EP | 1 672 702 A1 | 6/2006 |
| EP | 0999601 B1 | 12/2006 |

* cited by examiner

*Primary Examiner* — Hung Ngo
(74) *Attorney, Agent, or Firm* — Rankin, Hill & Clark LLP

(57) ABSTRACT

The invention concerns a panel box, for the electrical connection of a photovoltaic module for a solar installation, with a base piece (1) for mounting on the photovoltaic module and for the electrical connection of a connection line of the photovoltaic module, and with another part for placement on the base piece (1). According to the invention, the other part is designed as a functional part (2), having at least one functional device performing an electrical and/or electronic function. This provides a panel box which is easy to install and, what is more, it enables an easy replacement of a defective component in event of a fault.

13 Claims, 7 Drawing Sheets

PANEL BOX

Figure 1:
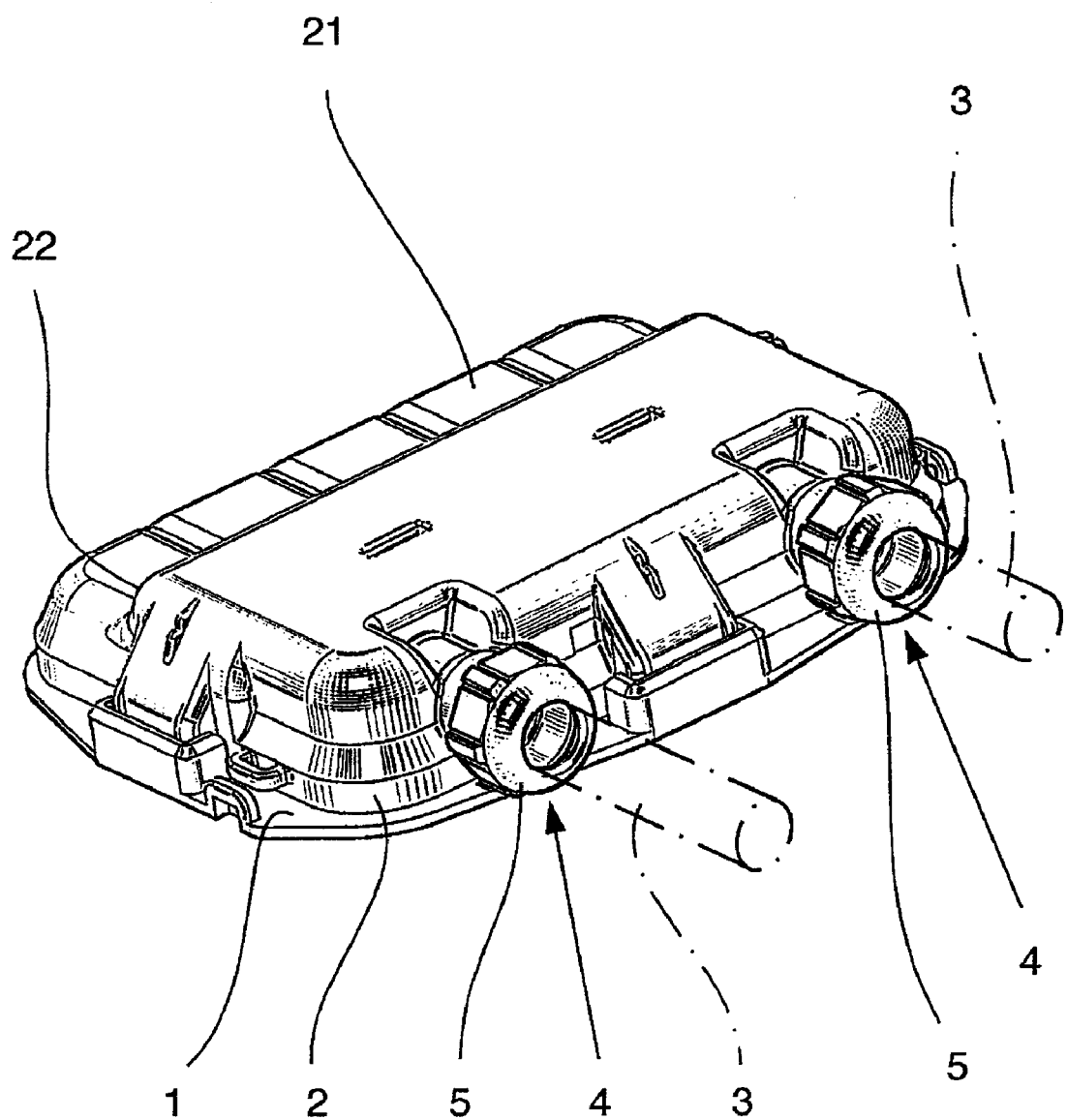

The invention concerns a panel box, for the electrical connection of a photovoltaic module for a solar installation, with a base piece for mounting on the photovoltaic module and for the electrical connection of a connection line of the photovoltaic module, and with another part for placement on the base piece. Such a panel box is known, e.g., from EP 1 672 702 A1.

A photovoltaic module generally consists of interconnected solar cells and is also known as a solar cell panel. The output voltage of a single photovoltaic module is generally too low to operate electrical devices, so that several photovoltaic modules are interconnected in solar installations. Generally, the photovoltaic modules are switched in series. However, a problem can arise if one photovoltaic module is partially shaded. A shaded photovoltaic module, of course, no longer produces voltage and in effect presents a diode in opposition to the flow of current. Hence, no more current can flow, so that the function of the entire system is impaired.

In order to remedy this problem, bypass diodes are provided when connecting together photovoltaic modules into a solar installation in panel boxes, being hooked up antiparallel to the photovoltaic modules. In this way, while a shaded photovoltaic module no longer contributes any more to the overall voltage of the solar installation, nevertheless the current flow as a whole is preserved, so that only a reduced operating voltage results. This also prevents any damaging of the shaded photovoltaic module.

Traditional panel boxes have thus far been fully outfitted, i.e., provided in particular with at least one bypass diode and connection cables for the photovoltaic module, on which they are secured. Thanks to a removable cover, the inside of the panel box is accessible, so that connection lines of the photovoltaic module can be hooked up. Moreover, in this way one has access to the bypass diodes, which can thus be replaced if defective.

In this context it should be pointed out that "connection line" means a line which is directly connected to the solar cells and which is led out from the photovoltaic module for purposes of its electrical connection and can make contact once again there. By contrast, in the present document "connection cable" means a cable which can be led up to the panel box by the consumer or from another photovoltaic module and which makes contact once again in the panel box.

In general, however, no changing of bypass diodes is done for a solar installation already in operation. Since the photovoltaic modules are often located in hard to reach places, such as on the roofs of houses, a replacement would be very costly and even dangerous on occasion. Also, a replacement of the entire panel box is not without problems, since when the box is replaced one often can no longer guarantee the seal for the exit locations of the connection lines from the photovoltaic module.

As a result, therefore, when there is a defect in the panel box, one often replaces the entire photovoltaic module. Although this can ensure a continued reliable operation of the solar installation, it is still a costly and inefficient method.

The problem of the invention is to specify such a panel box that is easy to install and, what is more, enables an easy replacement of a defective component.

Based on the initially described panel box, this problem is solved in that the other part on which the base piece can be placed is designed as a functional part, which means that it has at least one functional device performing an electrical and/or electronic function.

The panel box of the invention thus involves a complete rejection of the traditional procedure whereby a housing of the panel box is secured onto the photovoltaic module with all necessary components. According to the invention, the base piece in fact constitutes merely the base for connecting at least one connection line of the photovoltaic module and for fastening the functional part to the module. Thus, a functional device performing an electrical and/or electronic function does not have to be provided in the base piece. Instead, such a functional device is provided in the functional part which can be fastened onto the base piece, so that in event of a defect of the functional device the functional part as a whole can be easily replaced, without having to endanger the above-mentioned seal of the photovoltaic module, for example. Furthermore, a changing of the functional part fastened to the base piece is also relatively easy, so that this can also be done at hard to reach places, such as on the roofs of houses. In particular, it is preferable at least that the base piece not have any connection cable, which greatly facilitates the installation on the photovoltaic module, especially when the process is automated.

Basically, it is conceivable to secure the functional part in different ways to the photovoltaic module. According to one preferred modification of the invention, however, the functional part can be secured solely by means of the base piece to the photovoltaic module. This has the benefit that, once the base piece is put in place, no further steps need be taken with regard to the photovoltaic module itself in order to fully secure the panel box. Instead, the base piece provides all necessary functions in terms of fastening and electrical connection, so that neither can the connecting and fastening result in any damage to the photovoltaic module.

Various devices can be provided as the functional devices. According to one preferred modification of the invention, a bypass diode is provided as the functional device. In addition or as an alternative to this, an electrical or electronic protection circuit for the photovoltaic module can be provided as the functional device. Recently, protection circuits have become known which can replace bypass diodes in their functioning, but they can also safeguard much higher currents.

Also according to one preferred modification of the invention, a connection cable for the photovoltaic module can be provided as the functional device provided in the functional part. In general, preferably at least two connection cables will be provided. Moreover, according to a preferred modification of the invention, a connection device for the connection cable is provided as the functional device.

Such a connection device can be configured in different ways. According to one preferred modification of the invention, however, the connection device has a tube, preferably it is formed by a tube, into which is led one of the conduction leads of the connection cable. Furthermore, according to one preferred modification of the invention, the conduction lead in the tube makes electrical contact by means of a crimping and is also preferably held in this way. The providing of the connection device in the form of a corresponding tube is very simple in design, it allows for a secure hook-up of the conduction lead of the connection cable and ensures in addition an especially good heat dissipation. This especially good heat dissipation results, on the one hand, from the fact that, preferably, relatively massive tubes will be used. On the other hand, however, the round shape of the tube is better than flat shapes for the heat dissipation.

Various devices can be provided for hooking up the connection line of the photovoltaic module. According to one preferred modification of the invention, however, a junction device is provided in the base piece for the electrical connection of the connection line of the photovoltaic module, by means of which the connection device can be connected to the connection line. Preferably, a direct contacting of the connection device occurs, e.g., in the form of the above mentioned tube, with the connection line of the photovoltaic module.

According to one preferred modification of the invention, especially in this regard, the junction device is a spring clip, by means of which the connection line is pressed against the connection device. Here as well, it is advantageous to provide the connection device in the form of a tube, since this can be easily and securely inserted, perpendicular to its lengthwise dimension, into a correspondingly shaped spring clip and be held therein.

According to another preferred modification of the invention, moreover, a bypass diode is connected directly to the connection device. In particular, it is preferable that the connection device has a tube with a flattened region, in which the bypass diode can be welded or soldered.

Basically, the functional part can be of various geometrical shapes. According to one preferred modification of the invention, however, the functional part is configured as a hood. In this way, the functional part constitutes in effect a housing which can be closed by a cover, so that a good protection of the functional devices provided in the functional part is assured during manufacture, transport and installation, especially thanks to the side walls of the hood. The function of the cover is then taken on by the base piece fastened to the photovoltaic module. In particular, according to one preferred modification of the invention, the panel box can be closed, in particular, hermetically tight, by placing the functional part on top of the base piece.

Furthermore, according to one preferred modification of the invention, the height of the functional part in a marginal region is less than that in the other region, and so the functional part has a shoulder. In this way, for example, the panel box can be partly shoved underneath a metal frame placed around the photovoltaic module, so that one achieves an installation on the photovoltaic module as close as possible to the edge, thus saving space.

As already mentioned above, one problem area in photovoltaic modules is the sealing of the region in which the connection lines come out from the photovoltaic module. In general, one has to violate a protective coating there in order to lead out the connection lines, so that fundamentally there is the problem of penetration of moisture, which can damage the photovoltaic module. Accordingly, the problem also arises of achieving in simple and reliable manner a moisture-tight seal for the region of the photovoltaic module in which a connection line emerges. According to one preferred modification of the invention, the base piece has a bottom on its side intended for mounting on the photovoltaic module, having a caulking recess facing the photovoltaic module.

Thus, in terms of this aspect, a panel box is provided that can assure a reliable seal for the region of the photovoltaic module in which a connection line comes out from the photovoltaic module. The panel box is appropriately positioned for this, and the recess is appropriately caulked in tight manner with a sealing compound.

Basically, one can employ all known spraying and pouring methods for the caulking of the recess. According to one preferred modification of the invention, the caulking recess is arranged so that when the base piece is placed on the photovoltaic module, the region of emergence of the connection line from the photovoltaic module can also be caulked. This is especially important when a plurality of connection lines are provided, so that an appropriately configured common caulking recess is then provided, or several caulking recesses are provided, which together cover all exit regions of the connection lines.

Basically, it can be enough for the geometrical arrangement of a caulking recess or a plurality of caulking recesses to be oriented to the exit regions of the connection lines from the photovoltaic module. According to one preferred modification of the invention, however, the caulking recess also comprises a continuous opening provided in the bottom of the base piece for the connection line of the photovoltaic module. In this way, the continuous opening is at least partly molded along with the piece, so that an optimal sealing function is achieved. In particular in this case, but also basically in all the aforementioned embodiments, the particular continuous opening can be arranged exactly above the exit region of the connection line of the photovoltaic module, which makes possible an especially easy and also in particular an automated introduction of the connection line into the base piece of the panel box.

Another problem with panel boxes is that they are sometimes exposed to strong mechanical stresses, namely, during transport and installation, and also during operation of the solar installation. Especially at very low temperatures, the plastics typically used for panel boxes often become brittle, so that even moderate impacts can result in damage to the panel box.

Therefore, another problem of the invention is to specify a panel box which is as impact proof as possible.

Starting with the panel box described above, this problem is solved by providing a gasket for sealing the panel box between the base piece and the other part, being configured and arranged so that an impact acting on the other part is cushioned.

This solution of the invention can be provided both for the above indicated panel box and for all previously mentioned embodiments of this panel box.

According to this aspect of the invention, the gasket acts not only to seal the interior of the panel box against moisture, for example, but also assures a mechanical protection. Namely, if the part placed on top of the base piece suffers a blow, this will be cushioned by means of the gasket, which can resist a damaging of the other part, especially due to its material becoming brittle at low temperatures, and also a damaging of the panel box as a whole and the components contained therein.

According to one preferred modification of the invention, the gasket seals sideways against the side wall of the other part and the other part has ribs, by which it lies against the gasket so that the side walls are at a distance from the base piece. This produces a cushioning support of the other part against the base piece, whereby the sealing function, acting sideways, is functionally separate from the cushion function, acting perpendicular to this. Hence, the sealing function is not impaired by the additional cushion function.

Figure 2:
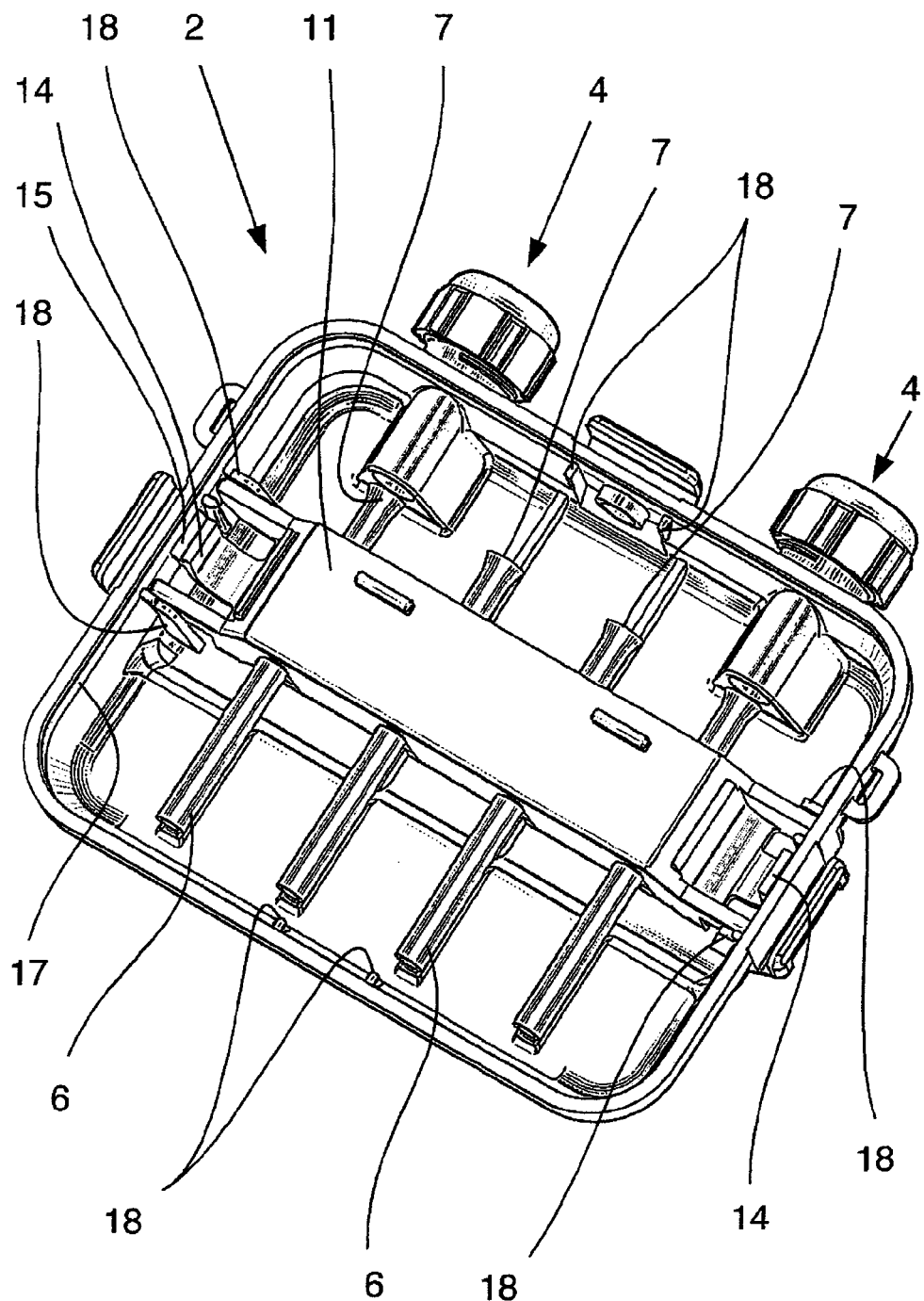
Figure 3:
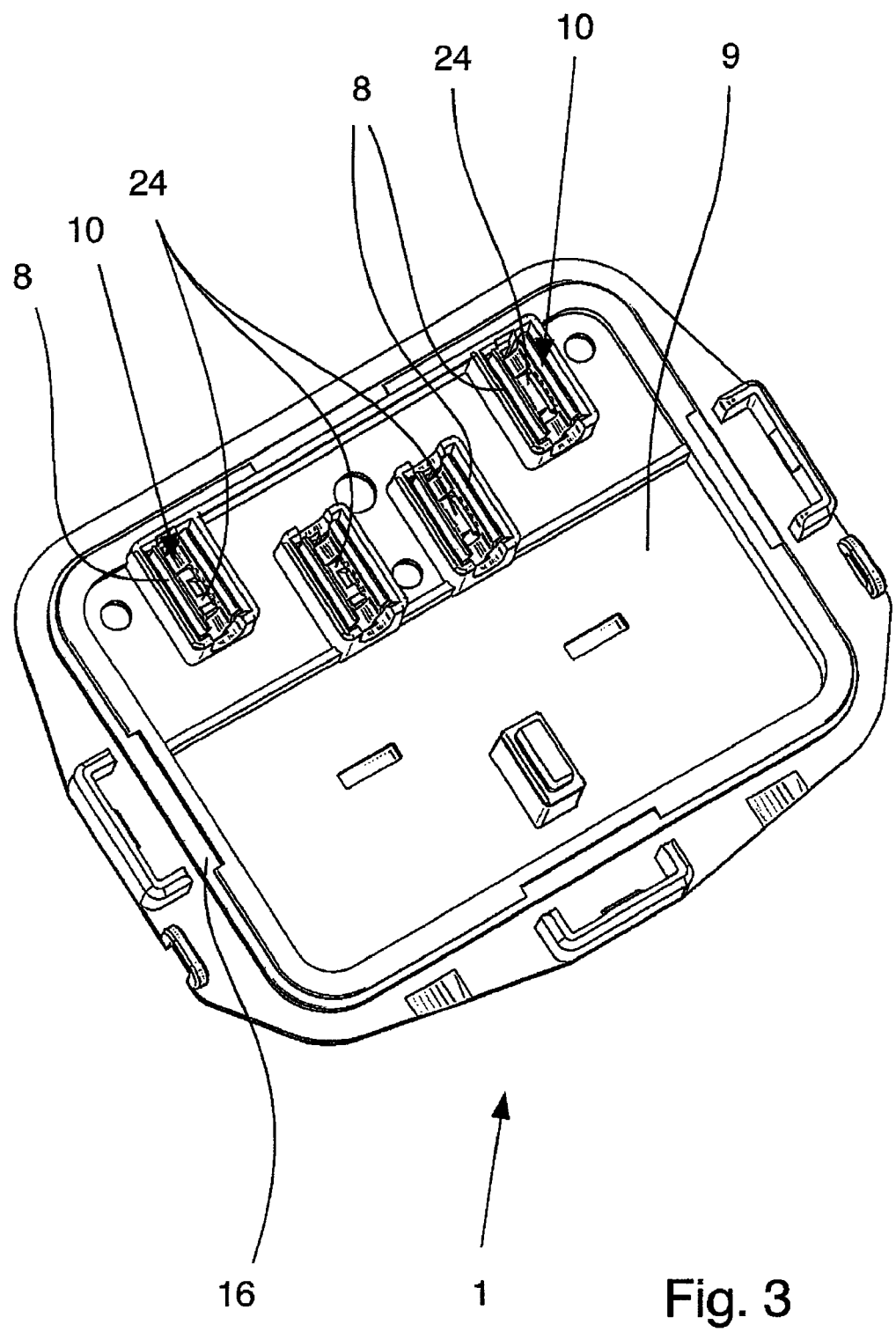
Figure 4:
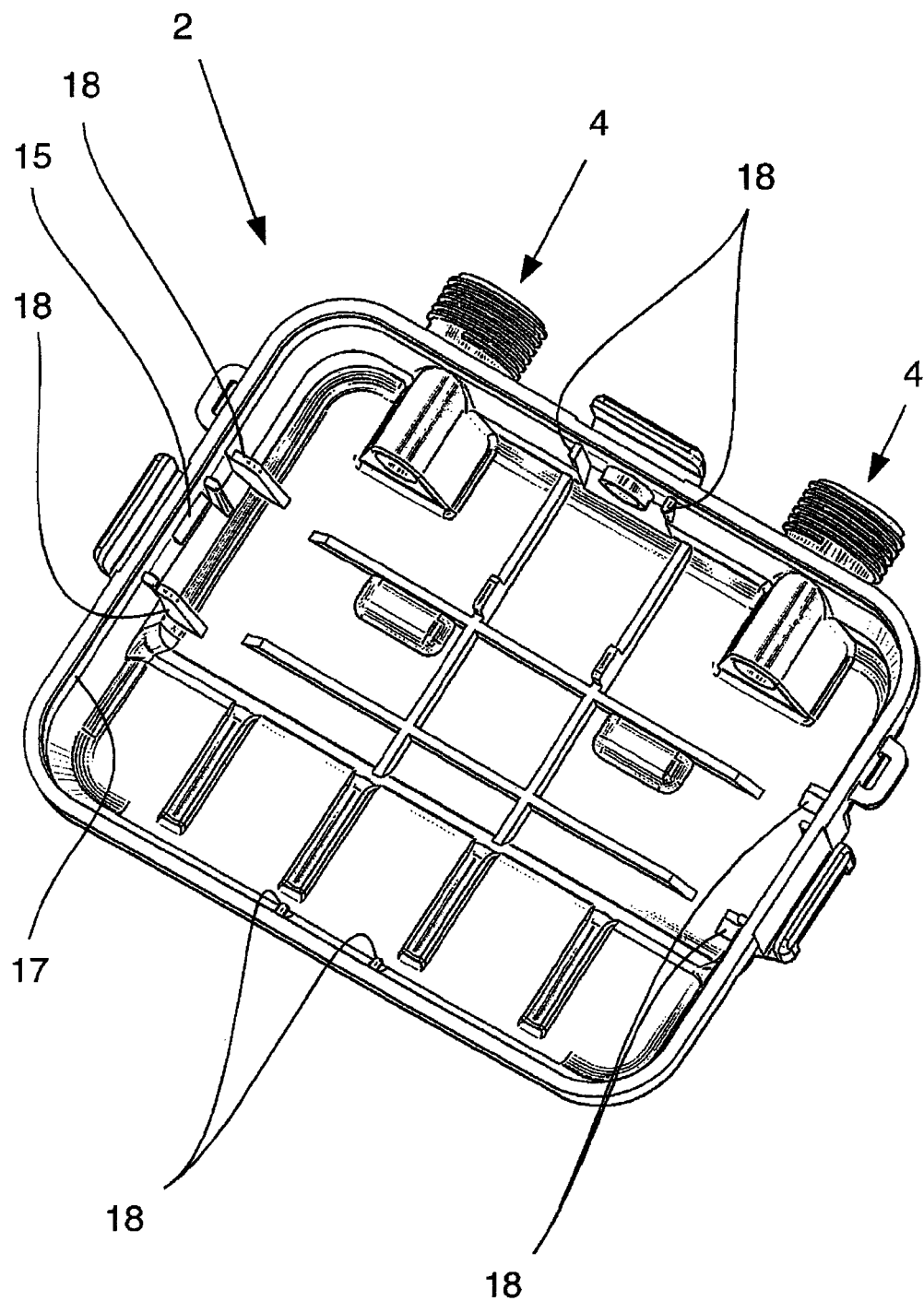
Figure 5:
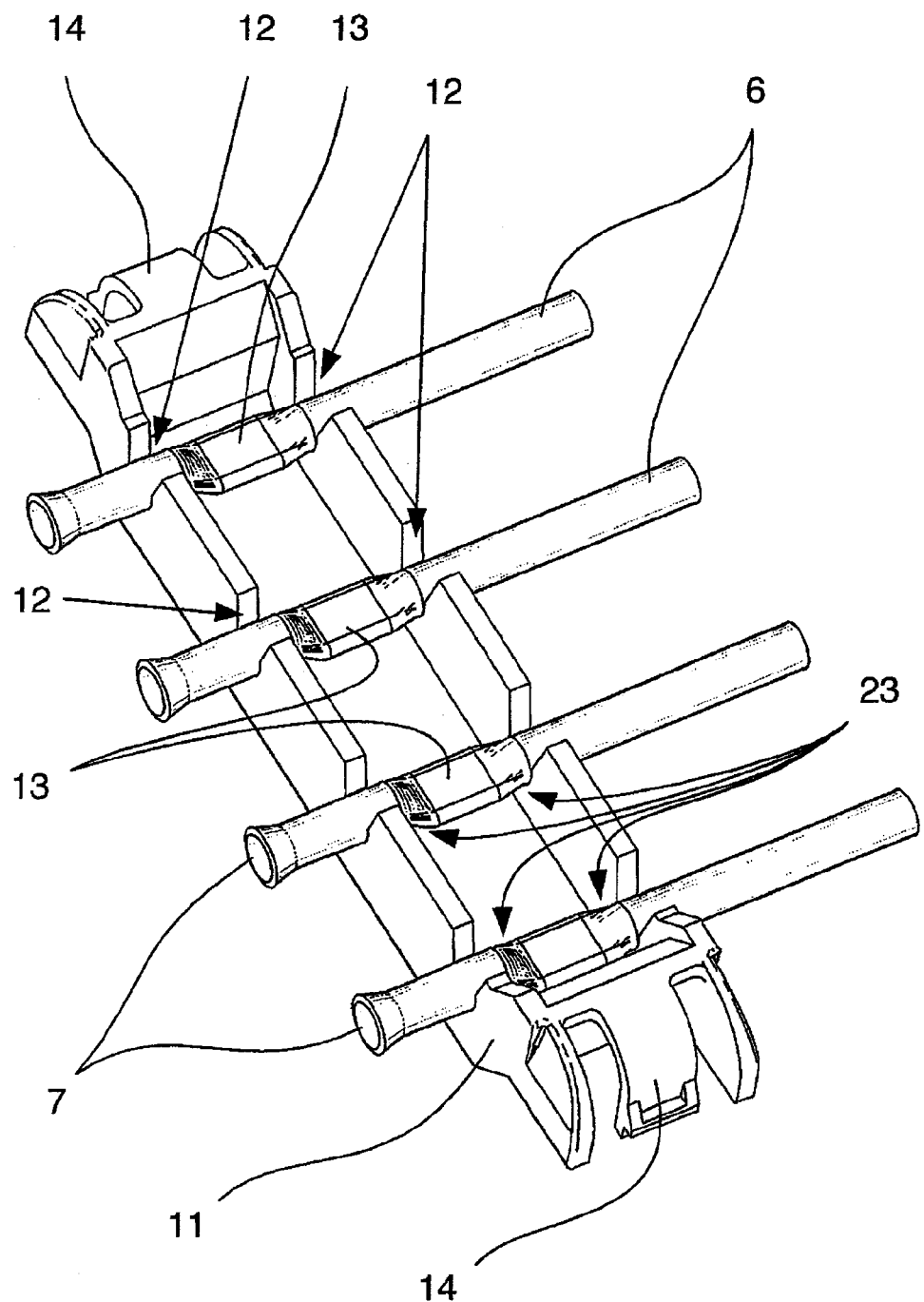
Figure 6:
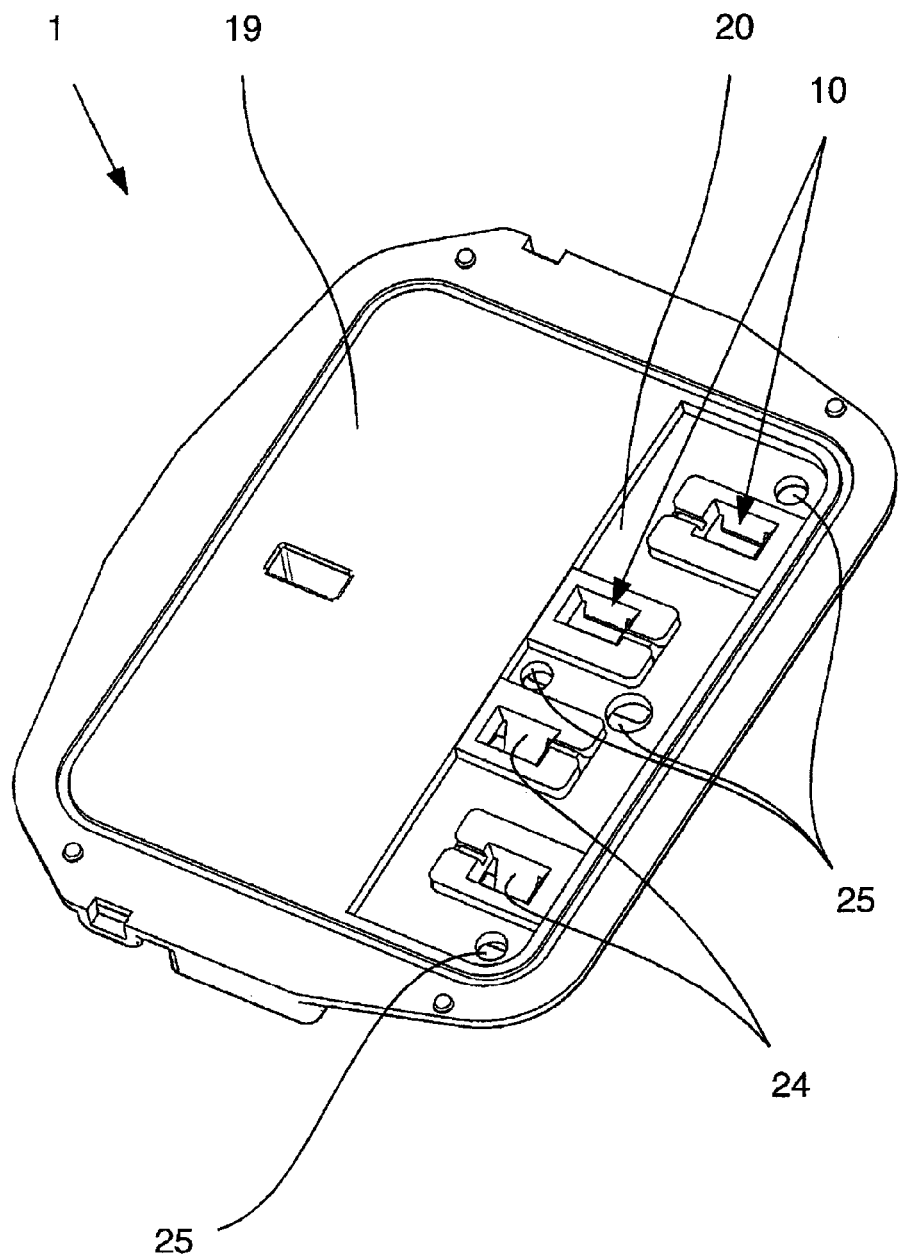
Figure 7:
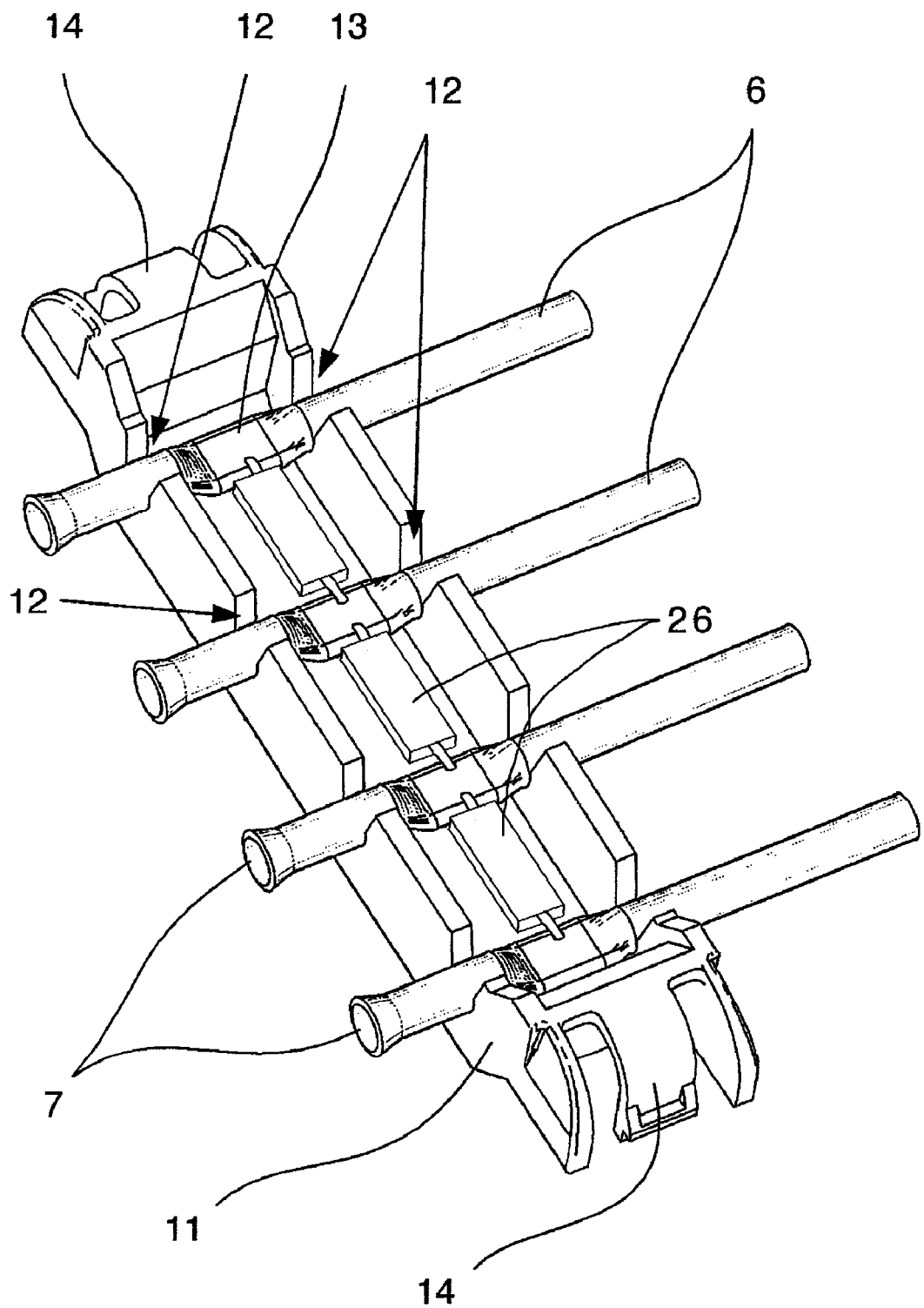

The invention shall now be explained in detail by means of a preferred sample embodiment, making reference to the drawing. The drawing shows:

FIG. 1 a panel box according to one preferred sample embodiment of the invention with a base piece and a functional part placed on top of it, FIG. 2 the functional part of the panel box according to the sample embodiment of the invention sample embodiment of the invention with functional devices, FIG. 3 the base piece of the panel box according to the preferred sample embodiment of the invention, FIG. 4 the functional part of the panel box according to the sample embodiment of the invention sample embodiment of the invention without functional devices, FIG. 5 the carrier mechanism with the connection devices arranged therein for the panel box according to the preferred sample embodiment of the invention FIG. 6 the base piece of the panel box according to the preferred sample embodiment of the invention from its side for fastening onto a photovoltaic module, and FIG. 7 the carrier mechanism with the connection devices arranged therein for the panel box according to another preferred sample embodiment of the invention, which includes bypass diodes.

FIG. 1 shows in the assembled state a panel box according to one preferred sample embodiment of the invention, in perspective view. This panel box is used for the electrical connection of a not otherwise represented photovoltaic module of a solar installation, which has a base piece 1 for mounting on the photovoltaic module and for the electrical connecting of a likewise not further represented connection line of the photovoltaic module and a functional part 2 as another part that is placed on the base piece 1.

As can be seen from FIG. 1, the functional part 2 has several functional devices that perform an electrical and/or electronic function. Such functional devices in the present case constitute, e.g., two connection cables 3, by means of which the photovoltaic module can be electrically hooked up via the panel box. These connection cables 3 are introduced through cable entry openings 4 into the functional part 2 of the panel box. A screwed cable gland 5 is provided as tension relief, acting on the insulation of the connection cable 3.

Moreover, as can be seen from FIG. 2, connection devices 6 in the form of tubes are provided as functional devices performing an electrical function. These tubes have an expanded opening region 7 at one end, as is especially noticeable in FIG. 2. Every two of these connection devices 6 with their expanded opening region 7 are arranged so that a conduction lead of a connection cable 3 introduced through the cable entry opening 4 can be introduced in simple and secure manner inside the tube. An electrical contact between the conduction lead and the tube, as well as a holding of the conduction lead in the tube, can be achieved by means of crimping.

Such a crimping can also be easily handled by means of a robot in the context of an automated assembly of the functional part 2. To make sure during such an automated assembly that the conducting lead of the connection cable 3 is indeed introduced into the tube, optical methods can also be employed, such as those which monitor a gap between the cable entry opening 4 and the expanded opening region 7 of the tube to determine whether the insulation of the conducting lead is visible.

FIG. 3 shows the base piece 1 of the panel box according to the preferred sample embodiment of the invention before putting in place the functional part 2. The base piece 1 has four spring clips 8. These spring clips 8 are each arranged above a continuous opening 10 provided in the bottom 9 of the base piece 1. The mutual arrangement of the continuous openings 10 is such that these are each situated above the exit region of the respective connection line of the photovoltaic module. With proper preparation of the connection lines of the photovoltaic module, the base piece 1 can be mounted on the photovoltaic module such that the connection lines of the photovoltaic module, which are often configured as thin flat bands, are automatically introduced through the continuous openings 10.

In each continuous opening 10 there is provided a deflection tongue 24, which ensures that a connection line, which is generally in the form of a flat or ribbon conductor, which emerges basically vertically from a photovoltaic module, is deflected by an angle of around 45° as it is introduced into the continuous opening 10. A joining of the connection lines of the photovoltaic module to the connection devices 6 of the functional part 2 in the form of tubes now occurs when the functional part 2 is placed on the base piece 1, as the tubes are inserted into the junction devices 8, configured as spring clips, in a direction perpendicular to their lengthwise dimension. By means of the spring clips, the ribbon conductors thereby make reliable contact directly with the tubes, so that the junction devices 8 themselves need not satisfy any special requirements as to electrical conductance, in particular, they can be made from ordinary spring steel sheet. The deflection tongues 24 ensure that the ribbon conductors cannot simply be pushed downward, since the ribbon conductors already lie sideways against the spring clips due to the deflection tongues 24.

In order to hold the connection devices 6 in the form of tubes in the functional part 2, a carrier element 11 is provided, as can be seen in FIG. 2 and in detail in FIG. 5. This carrier element 11 has recesses 12, in which the connection devices 6 are locked. To protect against twisting of the connection devices 6 and, what is more, afford an easy connection for bypass diodes, not otherwise depicted, the connection devices 6 are each provided with a flattening 13 in the region of the carrier element 11. A bypass diode 26 can easily and reliably be secured in the region of this flattening 13 by soldering or welding, as shown in FIG. 7. This type of fastening, moreover, allows one to use quite different types of bypass diodes.

To protect against twisting, the above described expanded opening region 7 of the tubes can also be angular rather than circular round at the outside, for example, it can be square in configuration. The aforesaid protection against twisting is assured by introducing the corresponding ends of the tubes into form-fitting recesses. The overall carrier element 11, moreover, is configured so that it can be removably secured in the functional part 2 by means of spring hooks 14 and mating projections 15.

This makes it possible to fully preconfigure and electrically "check out" the functional part 2 of the panel box with all its functional devices, such as bypass diodes, connection cables 3 and connection devices 6, so that it is only necessary to place this preconfigured functional part 2 on a base piece 1, arranged on the photovoltaic module, without any further work. This is especially advantageous in that, as pointed out above, the photovoltaic modules of a solar installation are generally arranged in hard to reach and possibly also dangerous places, such as the roofs of houses, and the work which has to be performed there is thus reduced to a minimum in this way. In particular, the base piece 1 can also be already pre-installed on the photovoltaic module.

As is evident from FIG. 3, the base piece 1 has a gasket 16 around its periphery. When the functional part 2 is placed on the base piece 1, the gasket 16 acts laterally against the side walls 17 of the functional part 2. However, the functional part 2 does not come into direct contact with the base piece 1, since the functional part 2 has ribs 18, by which it rests against the gasket 16. This produces a cushioning support for the functional part 2 on the base piece 1, so that an impact acting on the functional part 2 is more or less cushioned by the gasket 16. Especially at low temperatures and when material is brittle, one can in this way avoid damage to the functional part 2 and its components, as well as the base piece 1 under corresponding mechanical stress.

FIG. 6 shows the side of the base piece 1 intended for mounting on the photovoltaic module. At its side intended for mounting on the photovoltaic module, the base piece 1 has a bottom 19, in which a caulking recess 20 is provided, facing the photovoltaic module. This recess is arranged so that, when the base piece 1 is arranged on the photovoltaic module, the exit region of the connection lines from the photovoltaic module can be caulked. Since, when leading out the connection lines from the photovoltaic module, a protection coat also serving to seal the photovoltaic module is broken, one can ensure in this way that the seal of the photovoltaic module remains intact and no moisture gets it. In the present case, the caulking recess 20 also comprises the continuous openings 10 provided in the bottom 19 of the base piece 1, so that the continuous openings 10 can be co-molded with the piece and thereby be sealed. In order to ensure that the recess 20 can also be caulked when the base piece 1 is placed on the photovoltaic module, additional openings 25 are provided in the bottom 19 of the base piece, which can be used to feed in the caulk or as a riser.

So that the panel box can be partly shoved underneath a metal frame containing the photovoltaic module, thereby achieving an installation of the photovoltaic module as close as possible to the edge, thus saving space, the height of the functional part 2 in a marginal region 21 is less than that in the rest of the region. Thus, the functional part has a shoulder 22. Associated with this, in the presently described preferred sample embodiment of the invention, is the fact that the connection devices 6 provided as tubes do not run straight, but instead have a region 23 in which an axial displacement occurs.

The invention claimed is:

1. A panel box for the electrical connection of a photovoltaic module for a solar installation, the panel box comprising:
   a base piece for mounting on the photovoltaic module and for the electrical connection of a connection line of the photovoltaic module; and
   an other part for placement on the base piece, wherein the other part is a functional part comprising at least one functional device that performs an electrical and/or electronic function, wherein a first of said at least one functional device is a connection device for a connection cable, said connection device being in the form of a tube into which a conduction lead of the connection cable can be introduced to achieve electrical contact between the conduction lead and the tube, wherein a junction device is provided in the base piece for establishing electrical connection between the connection line of the photovoltaic module and the connection device, and wherein the junction device is a spring clip by means of which the connection line can be pressed against the connection device.

2. The panel box according to claim 1, wherein the functional part can be secured solely by means of the base piece to the photovoltaic module.

3. The panel box according to claim 1, wherein said functional part further comprises a bypass diode as a second functional device.

4. The panel box according to claim 1, wherein said functional part further comprises an electrical or electronic protection circuit for the photovoltaic module as a second functional device.

5. The panel box according to claim 1, wherein said functional part further comprises the connection cable for the photovoltaic module as a second functional device.

6. The panel box according to claim 1, wherein the conduction lead in the tube makes electrical contact by means of a crimping and is held in the tube by means of the crimping.

7. The panel box according to claim 1, wherein the functional part is configured as a hood.

8. The panel box according to claim 1, wherein the panel box can be closed by placing the functional part on top of the base piece.

9. The panel box according to claim 1, wherein the base piece has a bottom side intended for mounting on the photovoltaic module, said bottom side having a caulking recess facing the photovoltaic module.

10. The panel box according to claim 9, wherein the caulking recess is arranged so that when the base piece is placed on the photovoltaic module, the region of emergence of the connection lines from the photovoltaic module can be caulked.

11. The panel box according to claim 9, wherein the caulking recess comprises a continuous opening provided in the bottom side of the base piece for the connection line of the photovoltaic module.

12. The panel box according to claim 1, further comprising a gasket for providing a seal between the base piece and the other part, the gasket being configured and arranged so that an impact acting on the other part is cushioned.

13. The panel box according to claim 12, wherein the gasket seals sideways against side walls of the other part, and wherein the other part has ribs that lie against the gasket so that the side walls of the other part are at a distance from the base piece.

* * * * *